United States Patent [19]

Lessig, III et al.

[11] Patent Number: 4,734,629

[45] Date of Patent: Mar. 29, 1988

[54] VARIABLE SPEED TRIGGER SWITCH

[75] Inventors: William R. Lessig, III, Hunt Valley; Dale K. Wheeler, Fallston; R. Roby Bailey, Jr., Forest Hill, all of Md.; Stephen W. Smith, Raleigh, N.C.

[73] Assignee: Black & Decker Inc., Newark, Del.

[21] Appl. No.: 22,372

[22] Filed: Mar. 5, 1987

Related U.S. Application Data

[63] Continuation of Ser. No. 764,340, Aug. 9, 1985, Pat. No. 4,649,245.

[51] Int. Cl.⁴ .......................... H02P 5/06; H02P 7/00

[52] U.S. Cl. .................................. 318/332; 318/349; 200/157

[58] Field of Search ..................... 318/17, 332, 345 R, 318/345 H, 345 D, 331; 200/157, 153 LD, 153 R

[56] References Cited

U.S. PATENT DOCUMENTS

| | | | |
|---|---|---|---|
| 3,309,597 | 3/1967 | Gabor et al. | 318/393 |
| 3,753,067 | 8/1973 | Milligan | 318/314 |
| 3,845,373 | 10/1974 | Totsu et al. | 318/434 |
| 3,848,168 | 11/1974 | Hornung | 318/331 |
| 3,955,130 | 5/1976 | Graf | 318/332 |
| 4,076,999 | 2/1978 | Edwards et al. | 318/332 |
| 4,090,116 | 5/1978 | Lippitt | 318/345 E |
| 4,096,422 | 6/1978 | Fleming et al. | 318/314 |
| 4,153,863 | 5/1979 | Schachte et al. | 318/341 |
| 4,201,936 | 5/1980 | Roumanis | 318/331 |
| 4,217,526 | 8/1980 | Farr | 318/341 |
| 4,233,549 | 11/1980 | Dighe | 318/317 |
| 4,249,117 | 2/1981 | Leukhardt et al. | 318/275 |
| 4,254,368 | 3/1981 | Ido et al. | 318/603 |
| 4,290,001 | 9/1981 | Espelage | 318/811 |
| 4,291,355 | 9/1981 | Dinger | 318/334 |
| 4,301,396 | 11/1981 | Bourke | 318/490 |
| 4,307,325 | 12/1981 | Saar | 318/334 |
| 4,311,949 | 1/1982 | Pelkmann et al. | 318/334 |
| 4,317,176 | 2/1982 | Saar et al. | 318/334 |
| 4,346,434 | 8/1982 | Morinaga | 364/183 |
| 4,348,585 | 9/1982 | Hoffman | 368/318 |
| 4,628,233 | 12/1986 | Bradus | 318/306 |

*Primary Examiner*—Vit W. Miska

*Attorney, Agent, or Firm*—Harness, Dickey & Pierce

[57] ABSTRACT

A variable speed trigger switch particularly adapted for use with electric power tools such as drills. The trigger switch features clam shell construction and a single vertically disposed circuit board thereby facilitating assembly and resulting in a low cost and compact unit. Wire connections are kept to a minimum through use of the circuit board in accordance with this invention having power contact resistance and wire terminal connectors formed directly on the board. The trigger switch includes a locking feature enabling the trigger switch to be locked at a desired position and further provides an adjustable detent which can be felt by the user during trigger retraction. The electronics package of the trigger switch employs an electronic motor speed control circuit which provides a combination of open loop and closed loop motor control.

4 Claims, 13 Drawing Figures

FIG. 1.
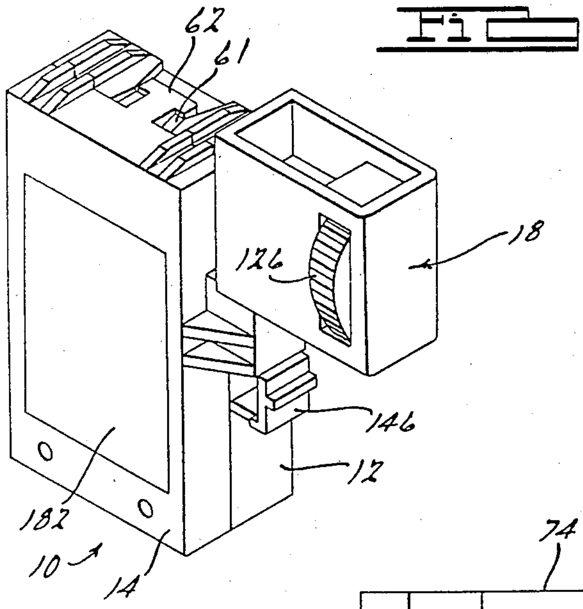
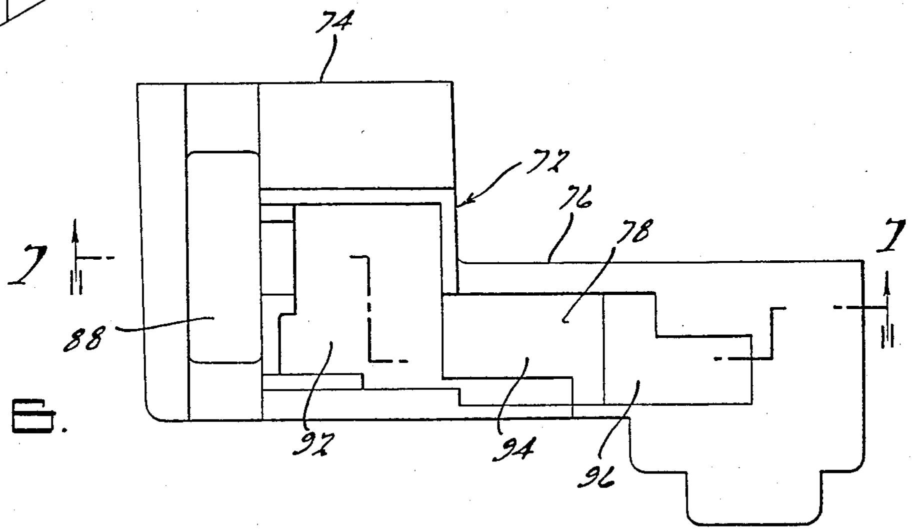
FIG. 6.
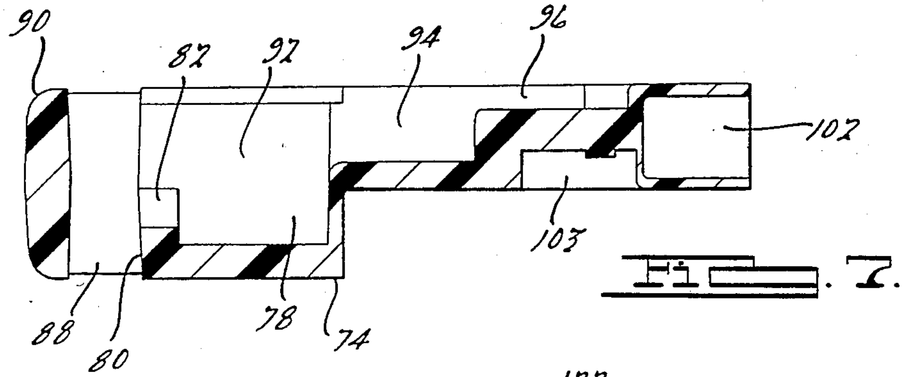
FIG. 7.
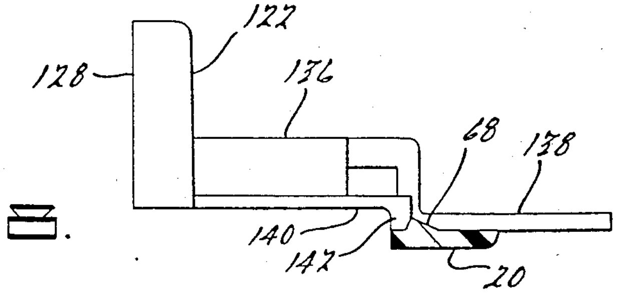
FIG. 8.

VARIABLE SPEED TRIGGER SWITCH

This is a continuation of U.S. patent application Ser. No. 764,340, filed Aug. 9, 1985, now U.S. Pat. No. 4,649,245.

BACKGROUND AND SUMMARY OF THE INVENTION

This invention relates to a trigger switch assembly, and particularly, to such a switch adapted for portable electric powered hand tools such as drills and the like.

Many hand power tools used in the home and industry feature variable speed control devices which are modulated by a trigger switch. These control devices permit the user to select the desired operating speed of the tool. For example, a drill equipped with a variable speed control enables the user to control the speed in accordance with the diameter of the drill bit being used or the workpiece material. Variable speed control systems further enable a portable power tool such as a drill to be used for various applications; for example, as a power screwdriver, sander, nut driver, etc. Typical variable speed control devices used in portable power tools are controlled by a trigger switch which causes the tool to operate at increasing power settings as the trigger is retracted. As an additional feature, many currently available trigger switches further incorporate a locking mechanism which enables the tool to operate at a selected power setting without continued application of pressure on the trigger switch. Certain of these devices further provide a lock adjuster mechanism which permits the power setting set by the locking device to be varied as desired.

This invention relates to an improved variable speed trigger switch of the above-described type having a number of improvements over those currently available. The trigger switch according to the present invention is uniquely configured to permit inexpensive, rapid automated assembly of the unit. More particularly, the trigger switch in the preferred embodiment is comprised of a clam-shell type housing which, when assembled, captures a miniature printed circuit board therebetween which contains the electronic motor speed control circuit (except for certain power supply components) on one side thereof and the variable resistance strip and stationary ON/OFF contacts of the switch on the other side. Additionally, electrical contacts for the line, motor and a tachometer generator are formed by conductive pads directly on the circuit board. In this manner, the overall size of the trigger switch is kept to a minimum, despite the inclusion of a sophisticated integrated circuit-based motor speed control circuit which allows the present trigger switch to be substituted in a wide variety of power tool applications without requiring the redesign and/or enlargement of present tool handle configurations.

Many present designs of variable speed trigger switches include locking mechanisms which have the disadvantage that, when a locked position less than a full power setting is selected, the range of travel of the trigger becomes limited by the locking mechanism even when the trigger is not locked. If the user of such a device desires full power output, the locking mechanism must be adjusted to permit full trigger travel even though the user does not intend to use the locking mechanism. Such designs further have the disadvantage that, when the locking device is being used, the user cannot further depress the trigger for an instantaneous increase in power without first readjusting the lock adjusting mechanism.

A variable speed trigger switch according to this invention has a locking mechanism which can be infinitely adjusted but which does not interfere with full travel of the trigger switch such that full power operation is always available to the user. As a further improvement over present variable speed trigger switches, the switch according to this invention further provides a detent which is felt by the user as a slight increase in resistance at a particular point as the trigger is depressed. The trigger position at which the detent is felt is adjustable in accordance with this invention through actuation of the lock adjusting mechanism. The detent enables the user to operate the tool at a desired power setting without engaging the locking mechanism if so desired. In a preferred embodiment of this invention, the adjusted lock position and the detent trigger position are the same. This configuration enables the detent to function as a means of enabling the user to quickly locate the trigger position at which the trigger locking mechanism can be engaged. The trigger switch in accordance with this invention further is well suited for portable power tools since it is lightweight, compact, inexpensive, and is suited for mass production. Further, the present switch features excellent heat dissipation characteristics, thereby providing electrical performance advantages. The preferred embodiment of the present invention also includes a novel electronic motor speed control circuit which provides a combination of open loop and "quasi" closed loop motor speed control. In particular, during trigger switch setting below a predetermined setting, the control circuit will operate in an open loop control fashion, whereas when the trigger switch is retracted beyond the predetermined trigger setting, the control circuit provides a varying degree of closed loop control.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a perspective view of the variable speed trigger switch in accordance with this invention;

FIG. 6 is a side elevational view of the trigger component with the speed adjuster removed;

FIG. 7 is a cross-sectional view taken along line 7—7 of FIG. 6;

FIG. 8 is a side view of an element of the lock adjuster assembly showing the detent finger engaging a ridge formed by the case member;

FIG. 9 is a partial cross-sectional view taken along a portion of line 4—4 of FIG. 3 showing a lead retainer clip engaging a conductor;

FIG. 13 is an exemplary speed versus torque curve for an electric motor used to describe the operation of the electronics package of this invention.

DETAILED DESCRIPTION OF THE INVENTION

Figure 4:
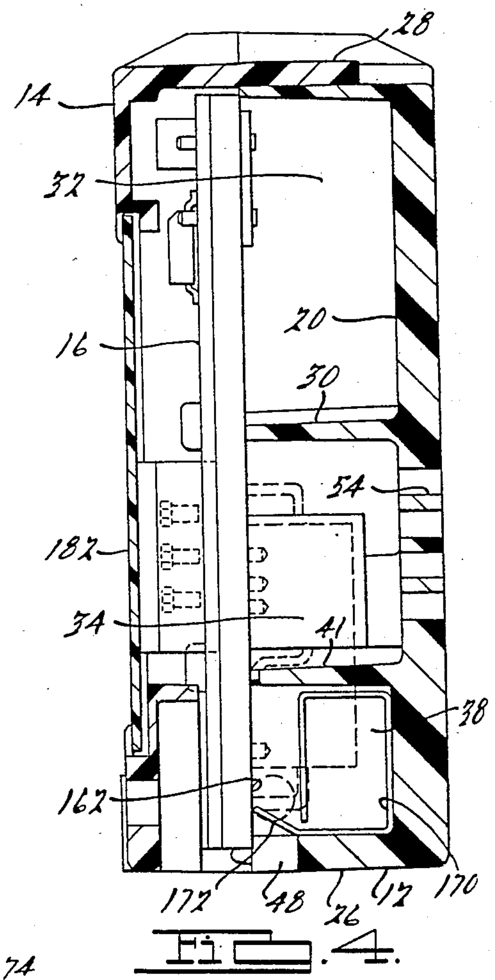
FIG. 4 is a cross-sectional view taken along line 4—4 of FIG. 3 with the printed circuit board component installed.

In order to more clearly describe the operation of the variable speed trigger switch in accordance with this invention, this description of the invention is divided into sections describing the mechanical configuration and mechanical operation, followed by a description of the electronics package of the device.

MECHANICAL CONFIGURATION

A variable speed trigger switch in accordance with this invention is shown by the Figures herein and is generally designated by reference number 10. Trigger switch 10 is generally comprised of case 12 and cover 14, with printed circuit (PC) board 16 and trigger assembly 18 sandwiched vertically therebetween.

Figure 2:
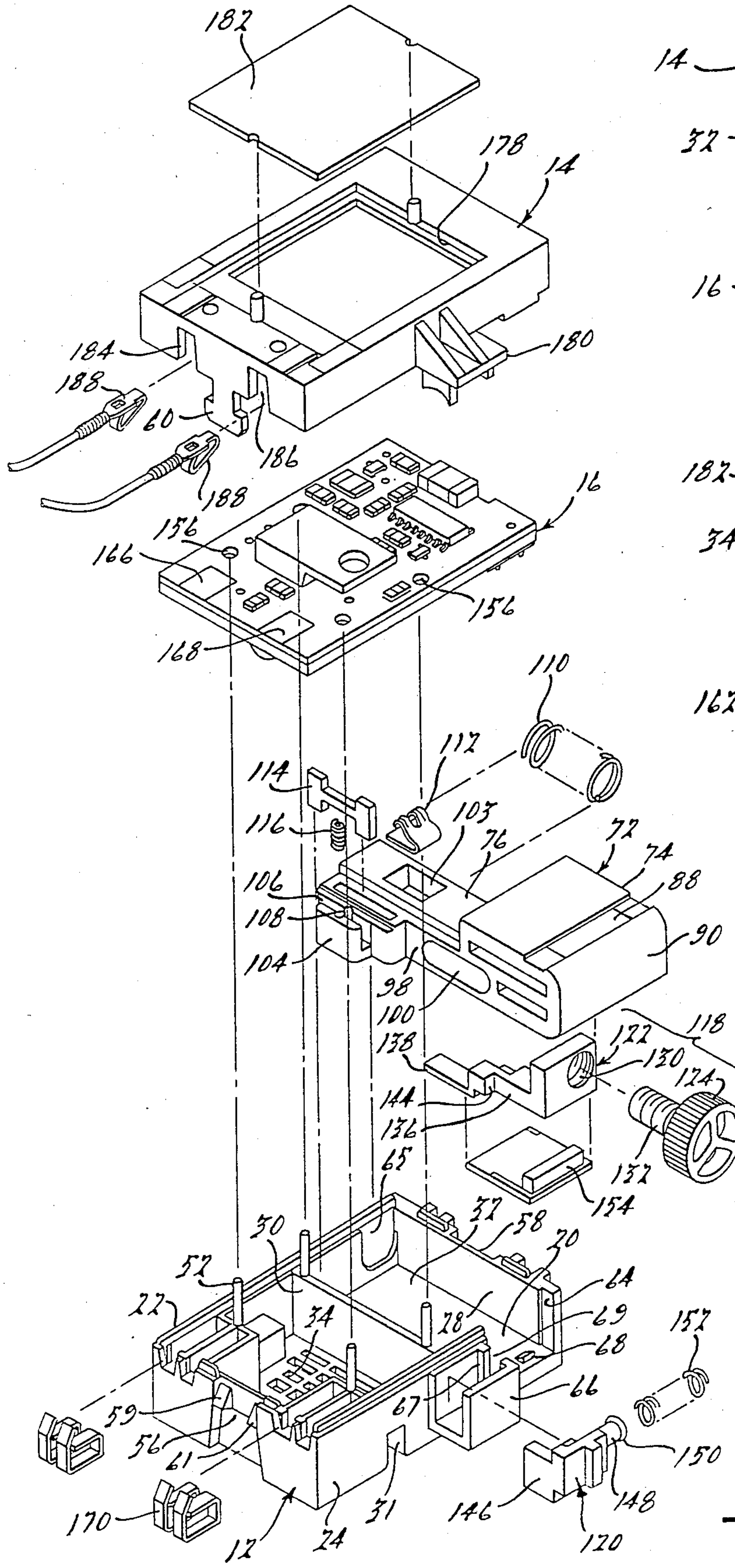
FIG. 2 is an exploded pictorial view of the trigger switch assembly in accordance with this invention showing the individual components thereof in exploded displaced positions.
Figure 3:
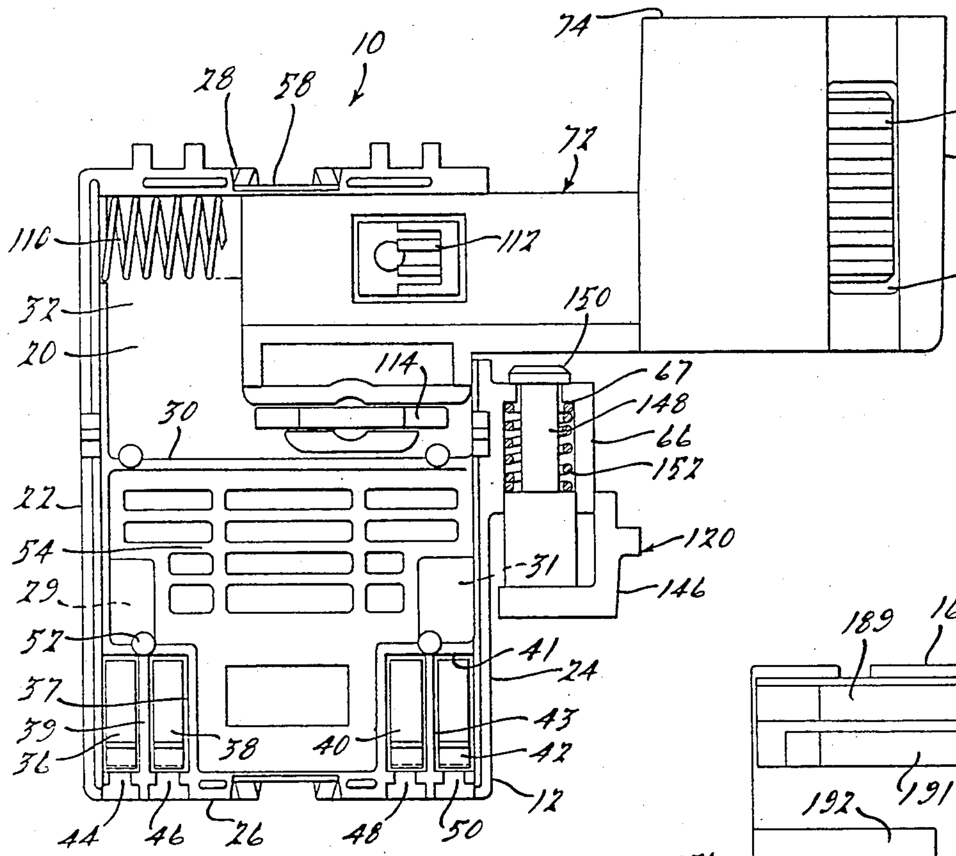
FIG. 3 is a side elevational view of the trigger switch assembly with the cover member and printed circuit board components removed.
Figure 10:
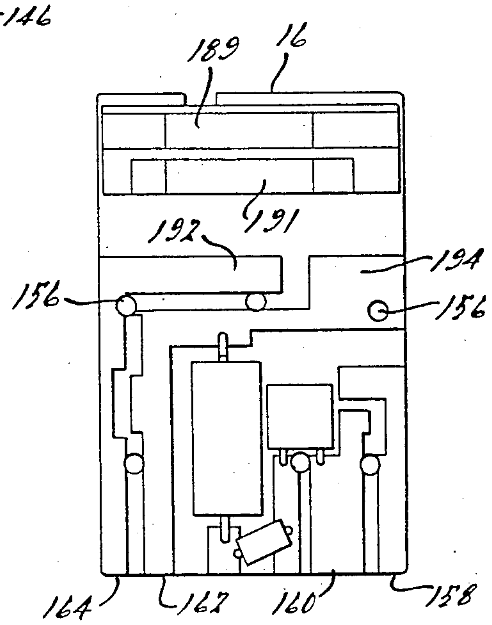
FIG. 10 is a top elevational view of the printed circuit board according to this invention.
Figure 5:
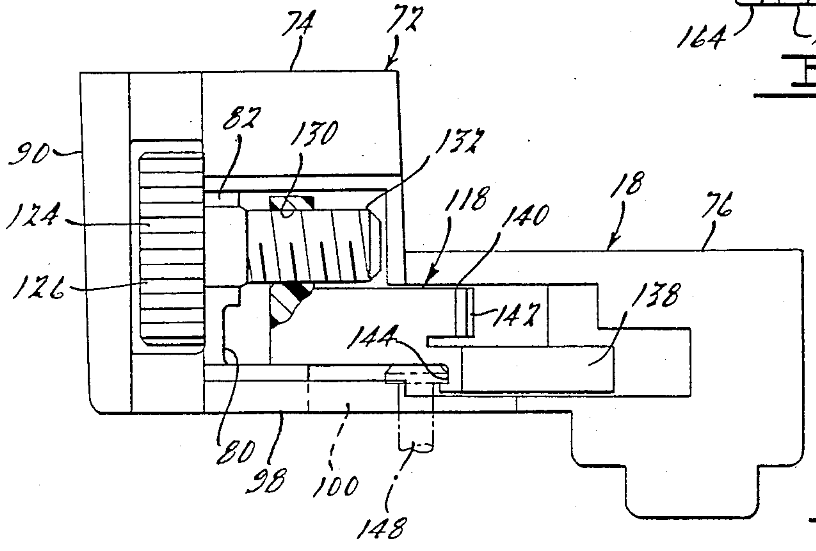

With particular reference to FIGS. 2, 3, and 4, case 12 is a generally rectangular box-shaped member having floor surface 20 with upstanding side walls 22 and 24, and end walls 26 and 28. Case 12 further includes partition wall 30 which extends across the case between side walls 22 and 24, to divide the case into a pair of separated compartments, namely, trigger compartment 32 and ventilated compartment 34. The outside surface of ventilated compartment 34 further defines a pair of separated notches 29 and 31 which may be used to position and mount the trigger switch within the associated power tool. Ventilated compartment 34 contains a pair of box-shaped lead retainer pockets 36 and 38 arranged adjacent side wall 22 and another pair of lead retainer pockets 40 and 42 arranged adjacent side wall 24. Lead retainer pockets 36 and 38 are defined by "L" shaped wall 37 and center wall 39. Similarly, pockets 40 and 42 are defined by "L" shaped wall 41 and center wall 43. Lead retainer pockets 36, 38, 40 and 42 define apertures 44, 46, 48, and 50, respectively, within end wall 26. Lead retainer pockets 36 through 42 are provided to receive electrical conductors as will be further explained below. Projecting upwardly from walls 37 and 41 and partition 30 are a plurality of upstanding posts 52 which serve to locate and retain the PC board 16. Floor 20, in the area of ventilated compartment 34, contains a number of opened slots 54 which provide for air circulation to enhance cooling of the electrical components on PC board 16.

The outside surfaces of end walls 26 and 28 define recesses 56 and 58, respectively, which are adapted to receive "T" shaped retention tabs 60 and 62 of cover 14. Recesses 56 and 58 each have associated therewith a central slot adjacent a pair of ramp surfaces 59 and 61 for deflecting the "T" shaped retention tabs 60 and 62 of the cover during assembly of the unit so that tabs 60 and 62 snap over the ramp surfaces and become secured in the recesses 56 and 58.

The trigger compartment 32 is adapted to receive the plunger portion 76 of the trigger assembly 18 through a rectangular opening 64 in the side wall 24 of case 12. Side wall 22 at the opposite end of trigger compartment 32 from trigger opening 64 defines a pocket 65 for receiving one end of trigger return spring 110. Located on the floor 20 of trigger compartment 32 adjacent trigger opening 64 is a protruding ridge 68 which coacts with the trigger speed adjuster 118 in a manner to be subsequently described. Immediately below trigger opening 64 on the outside surface of side wall 24 is a box-shaped lock retainer pocket 66 having two opened ends with upper wall 67 defining a narrow slot 69.

Figure 5:
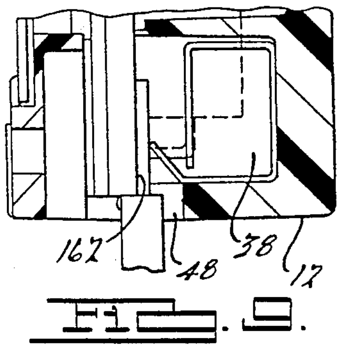
FIG. 5 is a side elevational view of the trigger assembly according to this invention.

Trigger assembly 18 includes trigger 72 having head portion 74 and elongated plunger portion 76. As best shown in FIGS. 6 and 7, head 74 and plunger 76 are hollowed out to define an elongated internally stepped cavity 78 for receiving lock adjuster assembly 118. Cavity 78 has a stepped internal surface defining cavity sections 92, 94 and 96 having progressively smaller lateral widths as best shown in FIG. 7. Cavity 78 is bounded at one end by wall 80 having a semi-circular opening 82. Trigger 72 further defines a laterally opening slot 88 which is bounded by walls 80 and end wall 90. As best shown in FIGS. 2 and 5, wall surface 98 defines an elongated slot 100 which opens into cavity 78. The end of plunger 76 opposite head 74 defines spring pocket 102 for receiving trigger return spring 110. Trigger plunger 76 further defines wiper pocket 103 which opens along a surface opposite cavity 78 and forms contact retainer 104 having slot 106 and spring retainer hole 108.

As shown in FIG. 3, trigger assembly 18 is installed within trigger compartment 32. Trigger compartment 32 is configured to permit longitudinal sliding motion of plunger 76. A biasing force is applied to trigger assembly 18 by trigger return spring 110 which becomes compressed between spring pocket 102 and pocket 65. This biasing force normally maintains plunger 76 in a position extended from trigger compartment 32. Wiper element 112 is installed within wiper pocket 103, and movable bridge contact 114 is installed in slot 106 and is biased by spring 116 in spring retainer hole 108. Longitudinal sliding motion of trigger assembly 18 causes electrically conductive wiper element 112 and bridge contact 114 to contact PC board 16 in a manner which results in variable power operation of the associated device. Specifically, as better explained below, wiper 112 contacts variable resistance strips 189 and 191 which together form trigger switch potentiometer R5. Power contact 114 cooperates with conductive pads 192 and 194 which switch the line voltage to the electronics package on PC board 16 such that no power is applied to the electronics until trigger 72 is partially retracted. Potentiometer R5 has resistance characteristics and is positioned so that, at the point of trigger travel where bridge contact 114 connects pads 192 and 194, the signal at the wiper of R5 is such that the power applied to the load by the motor speed controller is zero or minimal, thereby preventing arcing of pads 192 and 194 and contact 114. The electronics package incorporated within trigger switch 10 is designed so that increased pressure on trigger head 74 causing progressive retraction of plunger 76 results in increasing power settings for the associated power tool.

Variable speed trigger switch 10, in addition to providing variable speed operation, further provides a mechanism for locking the position of trigger assembly 18 to enable continous operation at a desired power setting. Trigger switch 10 further is provided with a detent mechanism which permits the user to reach a given power setting without locking the switch in position. These features are provided through the interaction of infinite speed adjuster 118 and lock 120. As best shown in FIGS. 2 and 6 through 8, infinite speed adjuster assembly 118 is comprised of element 122 and vernier adjuster 124. Speed adjuster assembly 118 is disposed within cavity 78 of trigger assembly 18 such that the ribbed outer periphery of adjuster knob 126 extends from slot 88 of trigger 72, thereby permitting rotation of adjuster knob 126 by the user. Speed adjuster assembly 118 is maintained in cavity 78 by cover 154 which is fused or bonded to trigger assembly 18. Element 122 includes a threaded bore 130 which receives threaded shaft 132 connected to adjuster knob 126. Speed adjuster element 122 further defines central post 136, offset extending finger 138, and detent finger 140. Lock engaging pocket 144 is formed at the junction between post 136 and finger 138. The end of detent finger 140 includes extending ridge 142. With particular reference to FIGS. 6–8, when infinite speed adjuster assembly 118 is installed in trigger cavity 78, portion 128 of adjuster element 122 is positioned in cavity section 92, whereas post 136 and finger 138 are located within cavity sections 94 and 96, respectively. Rotation of threaded shaft 132 causes longitudinal displacement of speed adjuster element 122 within trigger cavity 78.

Lock 120 is disposed within lock retainer pocket 66 and has actuation head 146, post 148, and engaging head 150. Post 148 is positioned within slot 69. Lock spring 152 is located around post 148 and acts on actuation head 146 and wall 67 to normally bias lock 120 away from trigger assembly 18. Engaging head 150, however, prevents lock 120 from being removed from lock retainer pocket 66.

Once trigger assembly 18 is loaded into trigger compartment 32, PC board 16 is placed onto case 12 such that posts 52 are positioned within corresponding holes 156. Posts 52 accurately and securely position PC board 16 relative to case 12, thereby properly positioning wiper element 112 and bridging conductor 114 relative to potentiometer R5 and contacts 192 and 194 on the PC board. Further, PC board 16 captures and controls the path of motion of trigger assembly 18. PC board 16 includes conductive pads 158, 160, 162, and 164, which are formed on the side of the PC board facing ventilated compartment 34. Pads 158 through 164 are connected to the power supply lines and to the motor. These pads, 158–164, are located within lead retainer pockets 36–42, respectively. Conductive pads 166 and 168 are located on the opposite side of PC board 16 and are connected to the tachometer generator, as described below. Lead retainer clips 170, best shown in FIGS. 4 and 9, are installed within retainer pockets 36–42. Lead retainer clips 170 are formed in a generally rectangular shape with an extending deflected leg 172. Lead retainer pockets 36–42 have a complimentary rectangular shape. When PC board 16 is located onto case 12, an electrical conductor can be inserted within apertures 44–50, thereby deflecting lead retainer clip leg 172 so that the end of the leg bites into the conductor and forces it against pads 158–164 on PC board 16 as shown in FIG. 9.

Cover member 14 is generally rectangularly shaped and defines the large aperture 178 in its major surface. Cover 14 has T-shaped retainer tabs 60 and 62 which are formed to engage recesses 56 and 58 to enable the cover to be locked into position onto case 12. Cover 14 defines lock retainer pocket cover 180 which retains lock 120 in position within lock retainer pocket 66. Metal heat sink plate 182 is disposed within aperture 178 and is positioned to directly contact the TRIAC Q2 which comprises the high level current carrying electrical component attached to PC board 16, thereby providing a large area heat sink which is exposed to the outer surface of trigger switch 10. Due to the excellent heat dissipation characteristics of heat sink plate 182, the current carrying capacity of the TRIAC Q2 is enhanced. Cover 14 further defines a pair of lead apertures 184 and 186 which enable the insertion of electrical terminals 188 which contact pads 166 and 168 of PC board 16.

MECHANICAL OPERATION

Now with particular reference to FIGS. 2, 3, and 5, the mechanical operation of trigger switch 10 and particularly the locking and detent functions will be explained. Locking of plunger 76 at a desired retracted position is achieved by first depressing trigger head 74, causing trigger assembly 18 to be retracted within trigger compartment 32. Lock 120 is thereafter depressed to cause posts 148 to extend into cavity 78 through slot 100. When pressure is relieved from trigger assembly 18, lock engaging head 150 is trapped within pocket 144. Since the longitudinal position of speed adjuster assembly 118 is variable within cavity 78, the lock position of the entire trigger mechanism becomes adjustable. When it is desired to cancel the lock, trigger assembly 18 is depressed, permitting post 148 to become disengaged from pocket 144 whereby lock spring 152 causes the lock to move to its disengaged position. Since the lock mechanism described above does not change the maximum degree of trigger travel which is possible, full power operation is always available to the user even when the locked setting is adjusted to a very low power setting.

Detent finger 140 having extending ridge 142, moves simultaneously with pocket 144 as vernier adjuster 124 is actuated. As best shown in FIG. 8, extending ridge 142 is positioned and designed to interact with ridge 68 of floor 20 to provide interference which can be overcome by continued application of force to trigger assembly 18. Ridges 142 and 68 are shaped so that when they contact, ridge 142 causes detent finger 140 to be deflected due to the cantilever loading imposed on it. Offset finger 138 provides reinforcement for speed adjuster assembly 118 by stabilizing central post 136 in response to loads exerted thereto due to locking of trigger assembly 18 or due to operation of the detent function. Engagement between extending ridges 142 and 68 provides the detent feature which can be felt by the user as an increase in force as trigger head 74 is depressed. Ridges 142 and 68 may be configured so that the detent pressure felt during trigger extension is less than that felt during retraction. The preferred relationship of extending ridge 142 and pocket 144 is such that this detent force is felt at the location where lock 120 can be engaged with lock engaging pocket 144. Therefore, the detent feature enables convenient location of the position where the trigger assembly 18 can be locked and also enables the user to locate a desired power setting position of the trigger without activating the lock feature.

ELECTRONICS PACKAGE

Figure 11:
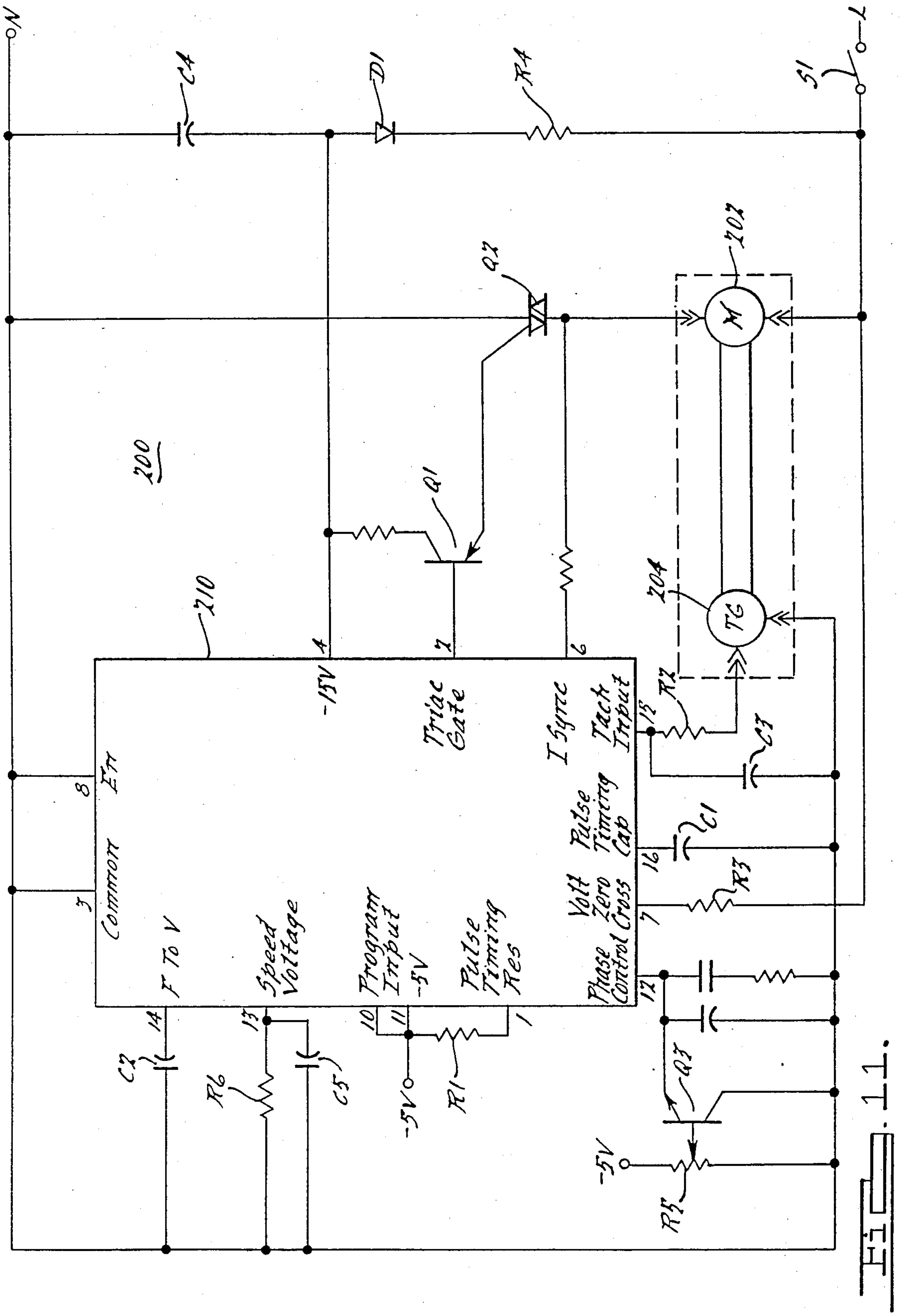
FIG. 11 is an electrical schematic diagram showing the electronic components of the trigger switch assembly according to this invention shown connected to a load in the form of an electric motor.
Figure 12:
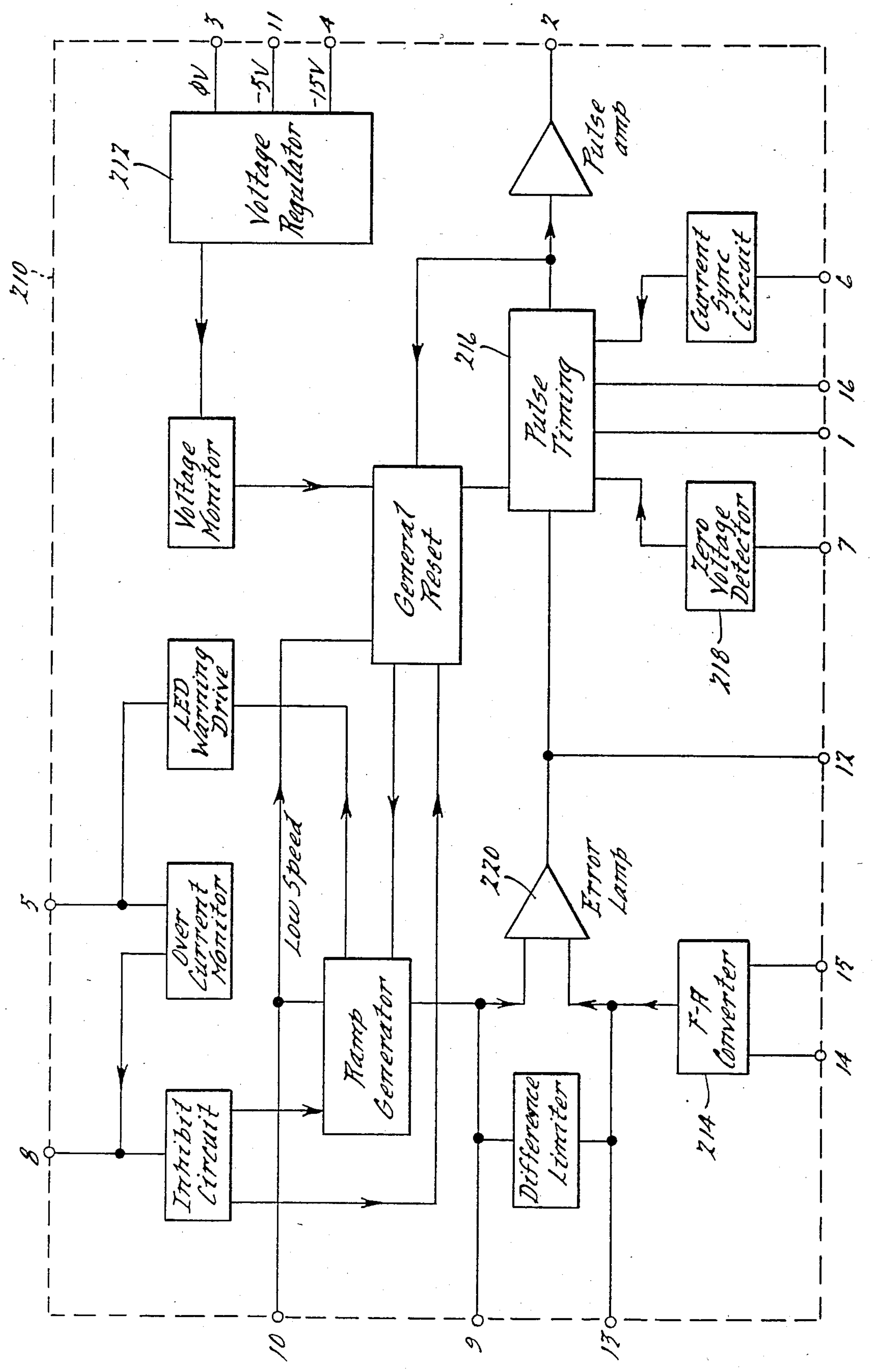
FIG. 12 is a block diagram of the motor speed controller integrated circuit carried by the printed circuit board of the trigger switch according to this invention.
Figure 12:
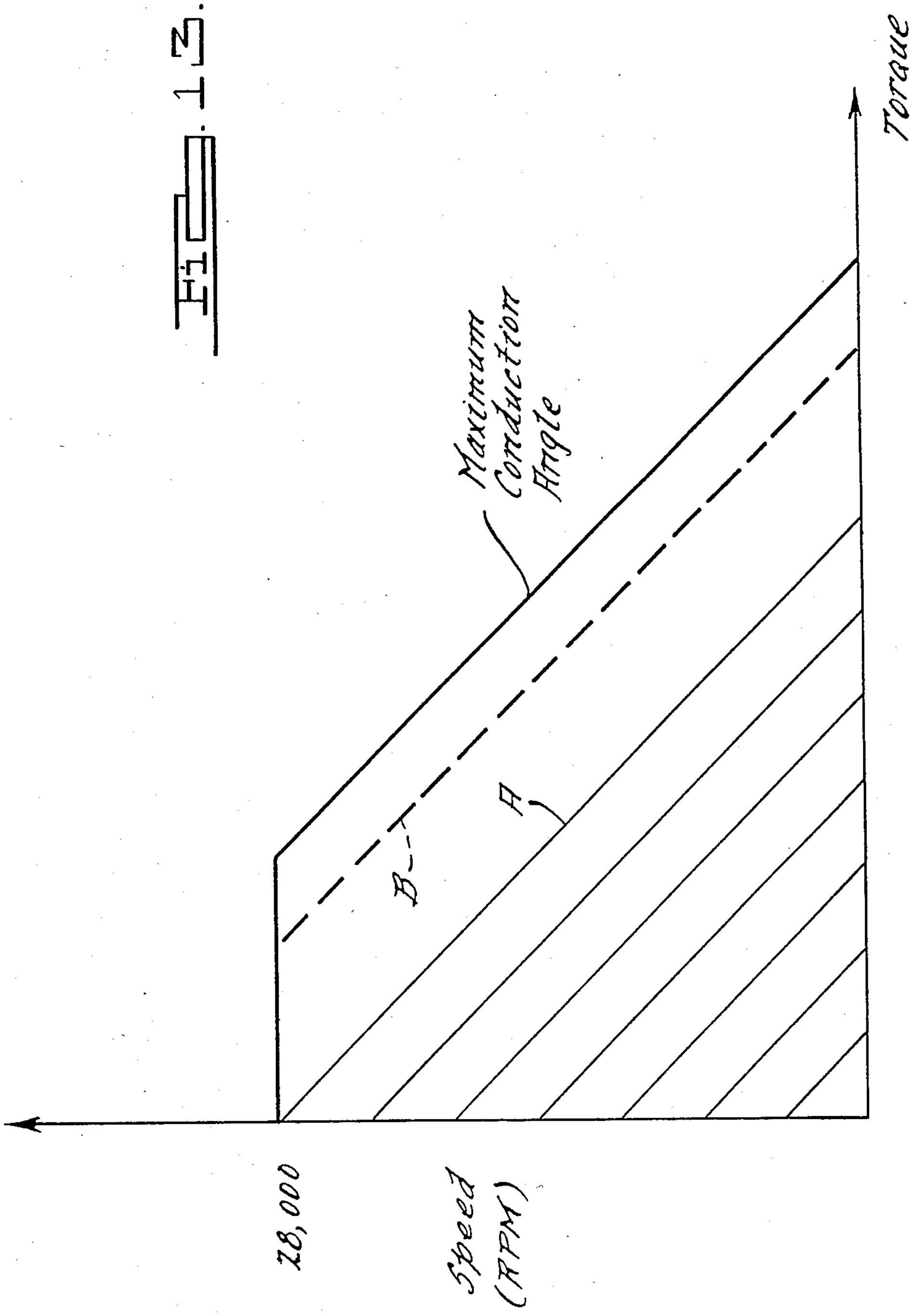

Referring now to FIG. 11, a circuit diagram of the electronic motor speed control circuit 200 utilized in the preferred embodiment of the present invention is shown. It should be understood, however, that the particular motor speed control circuit illustrated in FIG. 11 is merely exemplary of the type of motor speed control circuit contemplated by the present invention and that other motor speed control circuit designs, such as that shown in copending U.S. application Ser. No. 592,809, filed Mar. 23, 1984 and assigned to the assignee of the present application, may be readily employed. The present control circuit 200 is principally comprised of a standard commercially available motor speed control integrated circuit 210 manufactured by The Plessey Company under the designation TDA2085A. A detailed description of the construction and operation of this integrated circuit is contained in a publication entitled, *Motor Speed Applications Using the TDA*2085*A*, by The Plessey Company, Publication No. P.S. 1954, dated February 1982, which is incorporated herein by reference. The block diagram of the IC 210 is reproduced from said publication in FIG. 12.

The integrated circuit 210 develops −15 volts power (Vcc) directly from the 120 volt, 60 Hz AC line via external power supply circuit components comprising dropping resistor R4, diode D1 and capacitor C4. An internal voltage regulator 212 converts the −15 volts signal to a regulated −5 volts supply (pin 11). The motor 202 for the power tool is connected in series with a TRIAC Q2 across the AC supply lines. The control terminal of the TRIAC Q2 is connected to the emitter of a switching transistor Q1 which has its base connected to the TRIAC GATE output terminal (pin 2) of the IC 210. Motor speed information is supplied to the IC 210 by a tachometer generator 204 which is operatively associated with the armature shaft of the motor 202 so as to produce a pulsed output signal, the frequency of which is proportional to the rotational speed of the motor. An exemplary construction and mounting of a tachometer generator 204 as contemplated herein is shown in copending U.S. application Ser. No. 646,140, filed Aug. 31, 1984 and assigned to the assignee of the present application. The pulsed output signal from tachometer generator 204 is provided to the TACH INPUT (pin 15) of IC 210 where it is converted to a corresponding analog signal by an internal frequency-to-analog converter circuit 214. The value of capacitor C2 connected to pin 14 of IC 210 establishes the conversion factor for the converter circuit 214. Capacitor C3 together with resistor R2 comprise a low pass filter which serves to filter any tachometer generator noise, particularly upon start-up. Additionally, resistor R2 serves as a current limiter to the TACH INPUT of the IC 210.

The rotational speed of the motor 202 is controlled by conventional phase control of the AC line signal via TRIAC Q2. In particular, the firing angle of TRIAC Q2 relative to the AC line signal controls the amount of power supplied to the motor 202 and hence determines the power applied to the motor. In order to synchronize the internal pulse timing circuit 216 of the IC 210 with the AC line voltage, the IC 210 further includes a zero-crossing detector circuit 218 which receives the AC line signal at pin 7 via resistor R3.

The motor speed control IC 210 includes a conventional closed loop control circuit comprising a control or error amplifier 220 for comparing the programmed speed voltage with the converted tachometer generator motor speed signal and producing a TRIAC Q2 firing pulse when the output of the pulse timing circuit 216 attains a voltage level determined by the output from the control amplifier 220. In particular, the pulse timing circuit 216 comprises an RC-based timing network that produces a ramp voltage signal for controlling the firing of the TRIAC Q2 relative to the zero-crossing point in the AC voltage waveform. The values of capacitor C1 and resistor R1 determine the time constant of the pulse timing circuit and are standard values for a 60 Hz supply. The pulse timing circuit 216 is automatically reset upon each zero crossing of the AC voltage waveform, thus resulting in a sawtooth-type waveform signal. The output signal from the control amplifier 220 establishes the voltage level to which the pulse timing capacitor C1 must discharge before a TRIAC firing pulse is produced.

In conventional applications of the present motor speed control IC, a programmed voltage signal, typically from a potentiometer, is supplied to the PROGRAM INPUT (pin 10) of the IC to achieve variable closed loop motor speed control. In the present control circuit, however, the PROGRAM INPUT of IC 210 is tied directly to the −5 volts supply signal and the wiper terminal of the trigger switch potentiometer R5 is connected to the base of a transistor Q3 which has its emitter connected to the PHASE CONTROL terminal (pin 12) of the IC 210 and its collector tied to COMMON. The PHASE CONTROL terminal of the IC 210 is connected internally to the output of the control or error amplifier 220 which compares the actual motor speed signal to the programmed input signal. In this configuration, the transistor Q3 acts as a voltage clamp to clamp the output signal from the control amplifier 220 to the voltage at the wiper of potentiometer R5 minus the base-to-emitter voltage drop (VBE) of the transistor Q3.

The result of this circuit configuration on the control characteristics of the motor is illustrated by the exemplary speed versus torque curves for the motor at various conduction angles shown in FIG. 13. With the PROGRAM INPUT (pin 10) of the IC 210 tied directly to −5 volts (and the values of capacitor C5 and resistor R6 set at 0.1 mfd and 91 kohms respectively), the voltage level of the programmed speed signal in the preferred embodiment corresponds to a motor speed of approximately 28,000 rpm. Accordingly, without the voltage clamping transistor Q3, the speed control circuitry in the IC 210 would attempt to control the conduction angle of the TRIAC Q2 so as to achieve this "desired" speed value. However, the voltage clamping transistor Q3 serves to "fool" the IC 210 by limiting the output voltage of the error amplifier 220 which controls the conduction angle of the TRIAC Q2. Thus, as the trigger switch is initially retracted and the signal at the wiper 112 of the potentiometer R5 is relatively low, the control circuit 200 "acts" like an open loop controller by providing a fixed conduction angle, determined by the voltage level of the signal at pin 12, and the speed of the motor will vary in accordance with the load applied. This mode of operation will continue for progressively increasing trigger switch settings up to the setting corresponding to the conduction angle curve designated "A" in FIG. 13 which corresponds to a no load speed of 28,000 rpm. Beyond this trigger switch position to the fully retracted position, the control circuit 200 will function in a "quasi" closed-loop manner by seeking to maintain the speed of the motor at the "desired" 28,000 rpm speed setting, as the clamping transistor Q3 does not set the voltage level of the output signal from error amplifier 220, but merely limits the value of the output signal to the voltage at the wiper of the potentiometer R5 (minus VBE). However, the function of the control circuit 200 is characterized as quasi closed-loop in this range because the degree to which the control circuit 200 can advance the conduction angle of the TRIAC Q2 to maintain the 28,000 rpm speed level is limited by trigger switch settings corresponding to conduction angles greater than curve "A" but less than the maximum available phase angle. An example of this condition is represented by a trigger switch setting corresponding to the dotted line conduction angle curve designated "B". Thus, full closed-loop feedback control of the motor at the pre-established 28,000 rpm "desired" speed level is not realized until the trigger switch is in the fully retracted position and the maximum power level (i.e., 180 degrees conduction angle) is available.

While the above description constitutes the preferred embodiment of the present invention, it will be appreciated that the invention is susceptible to modification, variation and change without departing from the proper scope and fair meaning of the accompanying claims.

What is claimed is:

1. For a power tool having a motor and means for producing a feedback signal related to the actual speed of the motor, a variable speed trigger switch that is adapted to be connected to an AC power line and to the motor of the tool for controlling the application of power to the motor, comprising:

a housing defining a trigger aperture, a pair of stationary contacts one of which is electrically connected to the AC power line, a strip of electrical resistance material, a spring return trigger slidably mounted in said housing through said aperture and carrying a bridging contact adapted to electrically interconnect said stationary contacts as said trigger is retracted and a wiper contact adapted to contact along said strip of electrical resistance material as said trigger is retracted, and an electrical motor speed control circuit mounted on a printed circuit board located within said housing and including a semiconductor control device connected in series with said motor across the AC power line for controlling the application of power to the motor, and control circuit means for controlling the conduction angle of said semiconductor control device relative to the AC power line signal in accordance with the position of said trigger; said control circuit means including: (i) an integrated circuit adapted to provide conventional closed loop motor speed control and comprising a first input port adapted to receive a voltage signal related to the desired motor speed, a second input port connected to receive said feedback signal, error circuit means for comparing said voltage signal to said feedback signal and producing an error signal in accordance with said comparison, a first output port connected to the output of said error circuit means, and timing circuit means responsive to said error signal for producing a firing signal at a second output port in accordance with said error signal, (ii) a voltage supply circuit for providing a fixed voltage signal to said first input port of said integrated circuit corresponding to a predetermined motor speed, and (iii) clamping circuit means connected between said wiper contact and said first output port of said integrated circuit for limiting the voltage of said error signal to a value related to the voltage at said wiper contact, such that for voltage signals at said wiper contact below the value of said fixed voltage signal, said control circuit means functions as an open loop controller by providing a firing signal to said semiconductor control device in accordance with the value of the signal at said wiper contact and allowing the speed of the motor to vary in accordance with the load applied to the power tool, and for voltage signals at said wiper contact above the value of said fixed voltage signal, said control circuit means attempts to maintain said predetermined motor speed when the power tool is loaded by increasing the conduction angle of said semiconductor control device to a maximum conduction angle related to the value of the signal at said wiper contact.

2. The variable speed trigger switch of claim 1 wherein, said clamping circuit means comprises a transistor having its base terminal connected to said wiper contact and its collector and emitter terminals connected between said first output port of said integrated circuit and common.

3. A power tool having a motor adapted to be connected to an AC power line, means for producing a feedback signal related to the actual speed of the motor, a retractable trigger switch including variable resistance means for producing a variable voltage signal in accordance with the position of said trigger switch, a semiconductor control device connected in series with the motor across the AC power line for controlling the application of power to the motor, and control circuit means for controlling the conduction angle of said semiconductor control device relative to the AC power line signal in accordance with said variable voltage signal; said control circuit means including: (i) a motor speed control integrated circuit adapted to provide conventional closed loop motor speed control comprising error circuit means for comparing the signal received at a first input port with the signal received at a second input port and producing an error signal in accordance with said comparison, a first output port connected to the output of said error circuit means, and timing circuit means connected to the output of said error circuit means for producing a firing signal at a second output port in accordance with said error signal, (ii) a voltage supply circuit for supplying a fixed voltage signal to said first input port of said integrated circuit corresponding to a predetermined motor speed, (iii) means for supplying said feedback signal to said second input port of said integrated circuit, (iv) means for supplying said firing signal at said second output port of said integrated circuit to said semiconductor control device, and (v) clamping circuit means connected between said variable resistance means and said first output port of said integrated circuit for limiting the voltage of said error signal to a value related to said variable voltage signal, such that for variable voltage signals below the value of said fixed voltage signal, said control circuit means functions as an open loop controller by providing a firing signal to said semiconductor control device in accordance with the value of said variable voltage signal and allowing the speed of the motor to vary in accordance with the load applied to the power tool, and for variable voltage signals above said fixed voltage signal, said control circuit means attempts to maintain said predetermined motor speed when the power tool is loaded by increasing the conduction angle of said semiconductor control device to a maximum conduction angle related to the value of said variable voltage signal.

4. The power tool of claim 3 wherein said clamping circuit means comprises a transistor having its base terminal connected to said variable resistance means and its collector and emitter terminals connected between said first output port of said integrated circuit and common.

* * * * *